April 15, 1969 A. V. GALLARO ET AL 3,439,208
MULTICOLOR DISPLAY SCREEN DISTINGUISHING
BETWEEN FIXED AND MOVING OBJECTS
Original Filed Oct. 21, 1965 Sheet 1 of 2

INVENTORS
ANTHONY V. GALLARO &
BRYCE W. VAN NOY

BY Robert E. Strasser

ATTORNEY

INVENTORS
ANTHONY V. GALLARO &
BRYCE W. VAN NOY

BY

ATTORNEY

United States Patent Office 3,439,208
Patented Apr. 15, 1969

3,439,208
MULTICOLOR DISPLAY SCREEN DISTINGUISH-
ING BETWEEN FIXED AND MOVING OBJECTS
Anthony V. Gallaro, Auburn, N.Y., and Bryce W. Van
Noy, Bradford County, Pa., assignors to Sylvania Electric Products Inc., a corporation of Delaware
Continuation of application Ser. No. 500,085, Oct. 21,
1965. This application Nov. 21, 1967, Ser. No. 689,227
Int. Cl. H01j 29/18
U.S. Cl. 313—92           1 Claim

ABSTRACT OF THE DISCLOSURE

A luminescent screen for a cathode ray tube, and a method for making the same, to provide a display of color indicia relating to fixed and moving objects in a surveillance system employing a specific rate of scan. An inner layer of a UV excitable long persistence phosphor, having visible radiant energy emission, is disposed on a screen supporting surface. A filter layer is heat formed thereover to provide a barrier to the passage of cathode rays therethrough. Disposed on the filter layer, in proximal relationship to the cathode ray source, is an outer screen layer comprising a mixture of two electron responsive phosphors, one having short persistence and radiant energy emission in the UV region of the spectrum and the other having medium persistence and visible radiant energy emission.

---

This is a continuation of the application Ser. No. 500,085, filed Oct. 21, 1965, now abandoned.

Background of the invention

This invention relates to image display devices and more particularly to cathode ray tubes having phosphor systems in the screens thereof to provide comparative luminescent displays of fixed and moving information.

In modern navigational and tactical distance determination and surveillance systems, detailed knowledge of distant objects, both fixed and moving, constitutes information of significant importance. In such surveillance it is particularly desired that the information relating to moving objects be presented as a dynamic display to accurately convey direction and rate of movement thereof. Information of this type is conventionally determined by electronic means such as, for example, by radar equipment wherein pulsed electromagnetic energy is radiated from a rotating antenna to sweep a designated region. When the directed energy impinges against a reflective surface of an object in its path, many of the radiated pulses of the transmitted energy are reflected and returned as echoes to a receiver oriented relative to the transmitter source. Usually, the receiving apparatus utilizes a cathode ray tube as a plan position indicator (PPI) to present a visual display of the received reflected information. In this type of presentation, the repetitive sweep of the electron beam in the tube is normally visible in the form of a moving time-base line of light called a "trace" which originates at substantially the center of the screen of the tube and extends radially therefrom. Since each successive radially oriented trace occurs slightly to the right of the previous one, the trace appears to rotate as a scan in a continuous sweeping clockwise manner in synchronization with the turning antenna through the complete coverage of 360 degrees. There are various types of radar equipment wherein different rates of scan are utilized. In certain equipment, the rate of a complete rotational scan is less than one per second while in others the rate may be many per second.

The echoes from objects appear as bright spots or luminescent "pips" as the trace sweeps the screen of the tube. The cathodoluminescent screens utilized in this type of CRT display application usually employ phosphors having sufficient lengths of persistence whereby successive scans or sweeps of the electron beam will indicate both fixed and moving objects by either superimposed or separated pips of luminescence. By its characteristic of persistence, the phosphor retains a diminishing afterglow of light from the respective pips after the trace has passed, and upon successive scans, a luminescent pattern is thereby established. However, since the echo information from both fixed and moving objects is similar, it is difficult to rapidly differentiate between stationary and slowly moving objects.

Complex and sometimes bulky electronic moving target indicators have been constructed wherein the incoming echo signal information is fed through a delay line and beat against the scan signal of the succeeding frame in a manner to be 180 degrees out of phase. While this produces a cancellation of the signals reflected from fixed objects, it unfortunately also effects a partial cancellation of the reflected signals from slowly moving objects thus greatly diminishing the screen luminescence of such objects. A visual display embodying a plurality of luminescent indications of differing levels of intensity requires continual interpretative differentiation on the part of the viewing operator. This not only introduces a factor of time delay but also becomes a fatigue inducing aggravation with resultant variations in discernment. In addition, evaluation of luminescent intensities by different individuals assumes significance as a human variant.

Objects and summary of the invention

Accordingly, it is an object of the invention to reduce the aforementioned disadvantages and provide a luminescent information display wherein fixed and moving objects can be quickly and facilely identified.

Another object is to provide a luminescent display employing a phosphor system wherein fixed and moving objects are distinguishable by different designations of hue.

Another object is to provide a luminescent display having discernable luminescent characteristics wherein the judgment of differentiation and associated fatigue inducement are reduced to minimums.

Still another object is to provide a luminescent display device utilizing a phosphor system having radiant energy emissions of detectably different characteristics.

A further object is the provision of a luminescent display device that can be expeditiously and inexpensively fabricated and one that can be adapted to mobility with a minimum amount of associated equipment.

The foregoing objects are achieved in one aspect of the invention by the provision of a cathode ray tube having a screen comprising a phosphor system which when used in a surveillance display device will differentiate between fixed and moving objects by a substantial change in hue. This is achieved by employing a phosphor system wherein there are at least two cooperating phosphors having different persistences and different luminescent emissions. Signals echoed from a moving object excite a shorter persistence phosphor to produce a sequence of luminescent pips. The repetitive signals echoed from fixed objects cause excitation of both the shorter and the longer persistence phosphors to states of luminescence. Since the hues of these emissions are additive, a different hue is thus produced from the designation of fixed objects which is readily differentiated from that of moving objects.

For a better understanding of the present invention, together with other and further objects, advantages, and capabilities thereof, reference is made to the following specification and appended claims in connection with the accompanying drawings.

Description of the preferred embodiments

In this specification, "persistence" of a phosphor is defined as the period of duration, after cessation of excitation wherein the afterglow or phosphorescence diminishes to 10 percent of initial brightness. In a broad definition of persistence, in accordance with current usage, a very long persistence is considered to be in excess of about one second, a long persistence from about 100 milliseconds to one second, a medium persistence from about one millisecond to 100 milliseconds, and a short persistence less than about one millisecond. Usually the time factor involved for the growth or build-up of luminescence during excitation is somewhat similar to the persistence of afterglow, i.e. a phosphor having long persistence usually is characterized by a slow or long build-up of luminance under excitation. Thus, the term persistence when applied to a phosphor, is normally considered to be also indicative of the type of luminescent build-up involved. Also in this specification, use is made of the adjectival comparatives "shorter" and "longer" to indicate comparative degrees of persistence; such terms are not intended to be limiting or definitive in light of the aforementioned definition.

In one embodiment of the invention differentiation between fixed and moving objects is provided by two electron excited phosphors, contained in a common layer, each having a complementary luminescence and a different persistence.

Figure 1:
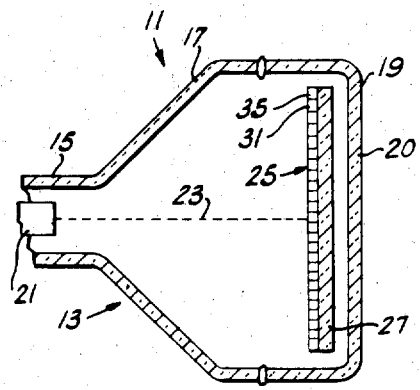
FIGURE 1 is a cross sectional view partially illustrating a cathode ray tube and an embodiment of the screen structure of the invention.

With reference to the drawings, there is shown in FIGURE 1 a cathode ray tube 11 having an envelope 13 comprising neck, funnel and face panel portions 15, 17, and 19 respectively. Within the neck portion 15 there is oriented an electron gun or beam source 21 from which emanates an electron beam 23 directed to impinge upon a luminescent screen 25 which is capable of exhibiting differential color displays to be fully described later in this specification. The construction is applicable to cathode ray tubes of various screen sizes. For descriptive purposes, a suitable example is a 5 AD series tube having a 5 inch screen and an anode voltage within an approximate range of 1 to 3 kv. The screen can be formed on the inner surface of the face portion of the tube or on a separate substrate positioned within the envelope relative to the face portion. In the embodiment shown, the screen is suitably disposed on the support surface of a substantially transparent support medium 27 compatibly positioned within the face panel 19 by means not shown.

The luminescent screen layer 25 comprises a homogeneous mixture of at least two phosphors having substantially different times of persistence and radiant energy emissions of detectably different characteristics. In this instance, the homogeneous mixture comprises two electron excitable phosphors, which, for pictorial clarity, are denoted as separate blocks 31 and 35 in screen 25 in FIGURE 1. One of these phosphors 31 is a material having a shorter persistence, for example one such as ZnS:Cu which is classified as P2 by the joint Electron Devices Engineering Council (JEDEC) and is a medium persistence phosphor. This material exhibits a luminescent emission in substantially the yellow-green wavelength region of the electromagnetic spectrum. The other phosphor component 35 in the screen mixture is one designated as having a longer persistence, for example one such as $KMgF_3$:Mn material which is JEDEC classified as P19 long persistence phosphor having a luminescent emission in substantially the orange-red wavelength portion of the spectrum.

The two phosphors are mixed according to weight proportions, for example, the mixture comprises about 15 to 25 percent of the shorter persistence material combined with about 75 to 85 percent of the longer persistence phosphor. Screen deposition is accomplished by conventional procedure.

Signals from moving objects produce a moving pattern on the screen 25 wherein the shorter persistence phosphor is quickly excited to produce a sequence of greenish colored pips of diminishing brightness indicative of the movement of the object. The repetitive signals echoed from a fixed object produces excitation of both the shorter and longer persistence phosphors. The complementary emissions therefrom are additive to provide a substantially white luminescent pattern of the fixed object. Thus, the rate of build-up and persistence of the longer persistence phosphor component 35 determines the rate of scan which will provide the desired differential color shift in the display. In the afore-described embodiment, the scan rate should desirably be in excess of twelve scans per second.

Since slower scan rates are often desired for certain radar applications, another embodiment of the invention satisfying this desire will be described in detail.

Figure 2:
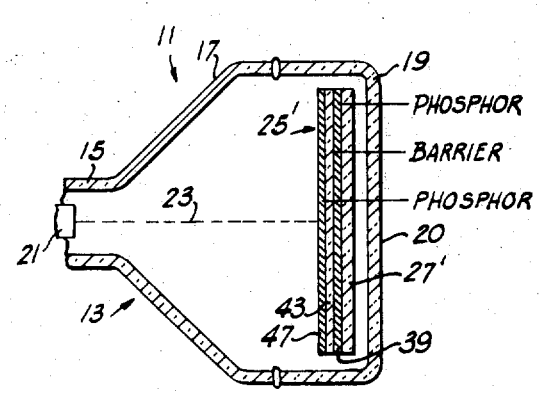
FIGURE 2 is a cross sectional view showing another embodiment of the screen structure of the invention.
Figure 3:
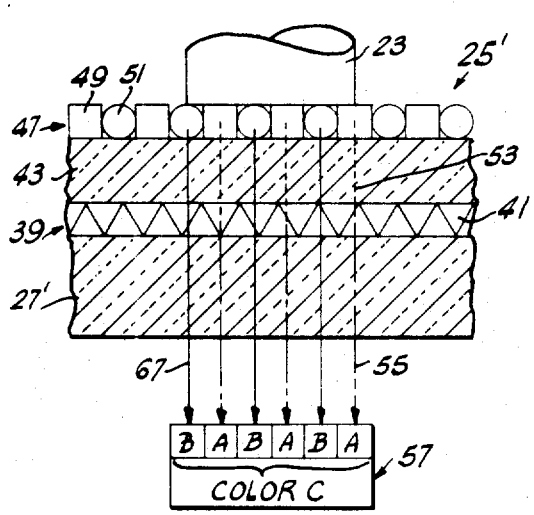
FIGURE 3 is an enlarged cross sectional portion of the screen shown in FIGURE 2 diagrammatically illustrating color screen excitation by signal information from a fixed object.
Figure 4:
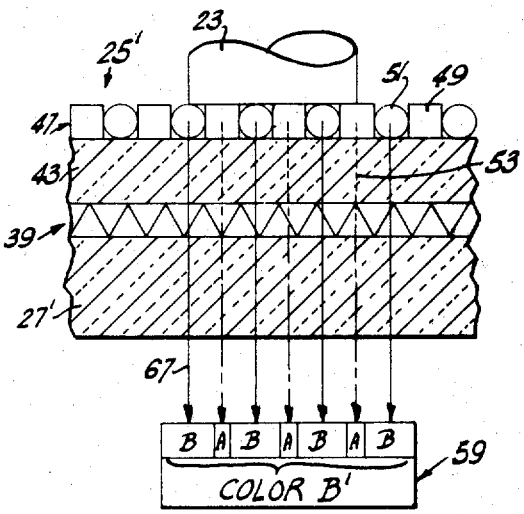
FIGURE 4 is an illustration similar to FIGURE 3 diagrammatically showing color screen excitation by signal information from a moving object.

With reference to FIGURES 2, 3, and 4, a multi-layered screen structure 25' is oriented, within envelope 13 of cathode ray tube 11, in a manner similar to that employed for screen 25 in FIGURE 1. The multi-layer screen 25' comprises an inner layer 39 disposed on the surface of the support medium 27' in the form of a radiant energy excitable phosphor 41 having visible radiant energy emission. Over this inner screen layer a selective barrier layer 43, impervious to the electron beam 23, is applied as an overlay; then a final or outer screen layer 47 oriented in proximal spaced relationship to the electron beam source 21, is applied in a uniform manner over the barrier layer. This outer screen layer comprises a mixture of two electron excitable phosphors 49 and 51 each having a different persistence. One of these, designated as the first phosphor 49 emits radiant energy of a first wavelength in predominately the ultraviolet region, while the other or second phosphor 51 provides radiant energy of a second wavelength in the visible portion of the spectrum. The barrier filter layer 43 is transparent to the radiant energy emissions of both of these phosphors.

In greater detail, with reference to FIGURES 3 and 4, the support medium 27' is in the form of a substantially transparent glass substrate of a ceramic material such as tempered soda lime glass having a light transmission characteristics in excess of 60 percent. The thickness is not critical except that it be of a sufficiency to withstand processing temperatures without warping or deforming. Upon this substrate, an inner screen layer 39 in the form of a coating of a radiant energy excitable phosphor 41 is suitably disposed by one of several conventional techniques, such as by settling, slurrying or dusting to provide a screen layer thickness of approximately .001 to .002 inch. An example of a phosphor selected for this application because of its particular hue in a ZnS:Cu material which is responsive to radiant energy excitation in the ultraviolet region and as previously mentioned is JEDEC classified as P2 material. When ultraviolet excited this P2 phosphor produces luminance in the yellow-green wavelength portion of the electromagnetic spectrum having a peak spectral output of approximately 5400 Angstroms and exhibiting a long build-up with a very long persistence in excess of one second. Under long-wave ultraviolet excitation certain of the copper-activated sulfide phosphors exhibit a much longer build-up and a much longer persistence than when electron excited, as for example the P2 in the previously described embodiment. Another ultraviolet excitable long persistence phosphor suitable for this application is, for example, JEDEC classified P28, a (Zn,Cd)S:Cu yellow-green luminescing phosphor having a peak spectral output of approximately 5500 Angstroms. In the described embodiment, the ZnS:Cu P2 phosphor is utilized as its peak spectral output is toward the green wavelength portion of the spectrum and provides an additive hue complementary with a subsequently described substantially red luminescing phosphor contained within another layer of the screen structure.

After deposition of the inner screen layer 39 upon the support medium 27', the structure is heated to remove volatile constituents of inner layer screen formation.

The intermediate selective barrier filter layer 43 of a suitable compound to block the passage of electrons and allow the transmission of radiant energy therethrough, is next applied over the inner screen layer 39 by known settling or spraying techniques. An example of a suitable barrier compound is a substantially silicon ceramic material such as 325 mesh 4-B leadless glass frit, as manufactured by O. Hommel Company, Philadelphia, Pa., which is suspended in a hexylene glycol-water vehicle for spray deposition. The concentration of the applied frit is such to effect a finished thickness of a sufficiency to be impervious to the electron beam velocities concerned. The formation of the barrier filter is accomplished by firing the frit coated inner screen layer and supporting medium at a suitable temperature for a time period sufficient to melt the frit and form a uniform layer of ceramic glaze.

The outer screen layer 47 is applied as a covering over the glazed barrier layer 43 by a conventional technique such as settling, slurrying or dusting. This layer comprises a uniform mixture of two electron responsive phosphors, one being a first electron excitable phosphor 49 having a radiant energy emission in substantially the ultraviolet wavelength region of the electro-magnetic spectrum and the other being a second electron excitable phosphor 51 emitting radiant energy in the visible wavelength portion of the spectrum.

An example of the first election excitable phosphor 49 having ultraviolet emission is a short persistence $2CaO \cdot MgO \cdot 2SiO_2$:Ce material designated by JEDEC number P16. When electron excited, this P16 phosphor emits radiant energy having a peak spectral output of approximately 3800 Angstroms which is representative of long wave ultraviolet and below the threshold of spectral response of the human eye. The persistence characteristic is very short being less than one microsecond duration.

The second electron excitable phosphor 51 having a medium persistence and a radiant energy emission in substantially the visible red wavelength portion of the spectrum may be in the form of a yttrium, gadolinium and/or lutecium trivalent vanadate or oxide host compound activated by europium and/or samarium. A suitable example of the above is $YVO_4$:Eu material classified by JEDEC as P22 Rare Earth Red. When electron excited, this phosphor produces a bright luminance of a red wavelength hue having a peak spectral output of approximately 6110 Angstroms. Since this rare earth phosphor exhibits a medium persistence of several milliseconds duration, it is suitable for screens in tubes whereof the scan rate will be higher than five cycles per second.

Another second electron excitable phosphor not of the rare earth grouping but suitable for this application, is one such as JEDEC classified P19 which is a $KMgF_3$:Mn material producing luminescence in substantially the orange-red wavelength region having a peak spectral output of approximately 5900 Angstroms. Upon electron excitation, this phosphor exhibits a long persistence in excess of 100 milliseconds which makes it a suitable phosphor component for screens being scanned at rates less than five cycles per second. Thus, in this embodiment the persistence of the respective second electron excitable phosphor is a controlling factor determining the optimum scan rates for which the screen is best suited.

Both of the electron excitable phosphors 49 and 51 which comprise the outer screen layer are of substantially similar particle sizes. Regardless of the technique of screen deposition employed, these two electron responsive phosphors are mixed according to weight proportions, for example, the mixture comprises about 60 to 85 percent of the first or shorter persistence phosphor and about 15 to 40 percent of the second or longer persistence material. The concentration of this mixture which comprises the outer screen layer 37 has an average density to provide a resultant thickness of approximately .001 to .002 inch.

After deposition, the outer screen layer is dried, and the multi-layered screen 25' is thence oriented within the face panel portion 19 of the tube envelope which, in turn, is hermetically bonded to the envelope funnel portion 17. The installation of the electron gun 21 and the subsequent processing steps are in accordance with conventional procedure.

Another embodiment of the selective barrier filter layer 43 may be in the form of selected oxides; an example of which is one such as silicon dioxide ($SiO_2$). When this barrier material is utilized, a film of lacquer material such as a methacrylate toluene formulation, is applied over the formed inner screen layer to provide a substantially smooth base for the barrier layer. This lacquer film is not shown as it is subsequently removed. When the lacquer film has formed, a coating of silicon monoxide (SiO) of substantially uniform thickness is disposed thereover. The respective support medium or face panel, with the partially completed screen structure thereon, is then baked at a suitable temperature for a period of time sufficient to convert the silicon monoxide to silicon dioxide ($SiO_2$) and to decompose and volatilize the lacquer film therefrom. The silicon dioxide selective barrier filter layer 43 thus formed is impervious to electrons and transmissive to radiant energy. The thickness of this barrier layer is likewise in accordance with the velocity of the respective electron beam employed. Next, the outer screen layer 47 is disposed over the barrier filter layer 43 in the manner previously described for forming outer screen layer 47, the phosphor constituents being the same. Thus, the two described multi-layered screen structures 25' are of similar construction differing primarily in the composition of the intermediate filter layer.

If enhanced brightness of the luminescent display is desired, a thin reflective aluminum film, not shown, can be applied over the outer screen layer by a conventional vacuum vaporization technique. The density of this aluminizing film should be in accordance with the velocity of the respective electron beam and of a thickness to permit passage of the beam therethrough without being detrimentally impeditive thereto.

Operationally, the aforedescribed multi-layered screen is capable of providing a differential color display between fixed and moving objects. With specific reference to FIGURES 3 and 5, there is diagrammatically shown color screen excitation by signal information from a fixed object. The reflected signal or echo from the fixed object is translated by the receiver in a manner that with each successive scan the echo information is superimposed upon that of the previous scan. The electron beam 23 scanning the screen impinges the outer screen layer 47 wherein are disposed the two electron excitable phosphors 49 and 51. The barrier layer 43 therebeneath, being impervious to electron penetration, confines electron excitation to this outer screen layer.

Under electron bombardment, the first electron excitable phosphor 49, aforedescribed as P16 short persistence material, gives off ultraviolet emission 53 which passes through the barrier layer 43 and impinges the radiant energy excitable P2 phosphor material 41 comprising the inner screen layer 39. The P2 being a very long persistence phosphor when excited by the P16 ultraviolet radiation, emits a luminescent yellow-green wavelength 55 which transverses the support medium 27' and is designated in the fixed object diagrammatic color block 57 as color component A. The electron beam 23 also excites the second electron excitable P22 medium persistence phosphor particles 51 that are disposed in the mixture contiguous to the first electron excitable particles 49. The radiant energy emission thereof is luminescent in the form of a substantially red wavelength 67 which traverses the barrier filter 43, the inner screen layer 39 and the support medium 27', being designated in the diagrammatic color block 57 as color component B. The two color component A and B being superimposed and intermixed are additive to form combined color component C. In this instance, A being substantially yellow-green and B being substantially red, an additive complementary combination of hues is formed to produce a substantially white resultant C; this being the luminescent display indicating the signal reflected from the fixed object.

Figure 5:
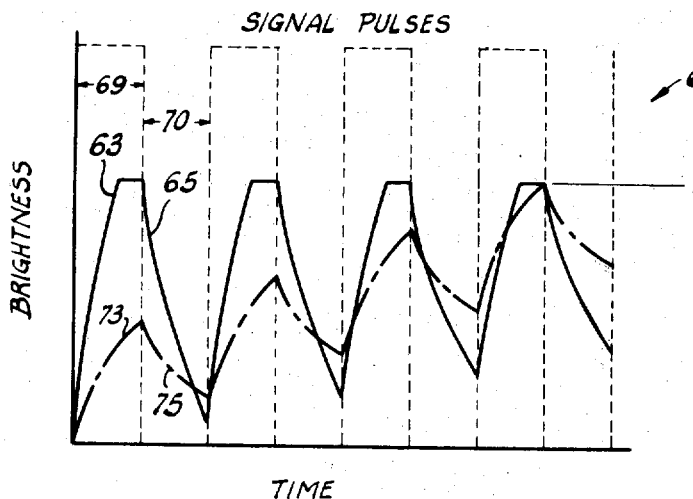
FIGURE 5 is a growth-decay curve showing the relationship between the excited luminescent phosphors as illustrated in FIGURE 3.

With particular reference to FIGURE 5, there is shown an exaggerated and non-proportioned growth-decay comparison 61 which is not truly representative but serves to illustrate the relationship between build-up times and persistences for the second electron excitable phosphor 51 and the radiant energy excitable phosphor 41 which form the visible complimentary components when a fixed object is luminescently portrayed.

The second electron excitable substantially red-emitting phosphor 51 is represented by substantially medium growth and persistence curves 63 and 65 respectively. During the repetitive signal pulses echoed from the fixed object the electron beam excites the second phosphor 51 causing luminescent growth 63. The signal pulses have sufficient width 69 to permit the luminescence to reach a steady-state brightness level 71 which is a function of the applied voltage and current density. The increase in brightness is substantially linear up to the point of screen saturation or steady-state brightness whereat the luminescent centers available for emission are fully excited so that additional current gives no increase in brightness. The distance between pulses, or pulse separation 70, is not of sufficient duration to allow for complete luminescence decay.

Figure 7:
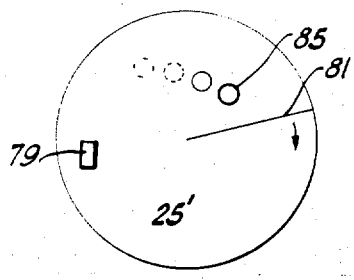
FIGURE 7 is a plan view of the observable face portion of the display tube showing luminescent patterns of fixed and moving objects.

The ultraviolet excitable substantially yellow-green emitting phosphor 41 has a slower growth curve 73 and a longer decay or persistence curve 75 in comparison to the aforementioned phosphor. The width of each signal pulse is not sufficient to permit the full growth in brightness nor is the pulse separation sufficient to allow for substantial luminescent decay. Therefore, with successive signal pulses supplying additive excitation or reinforcement to the same luminescent centers, growth in brightness increases with each pulse until a steady-state brightness level 71 is reached. For simplification, in this illustration a common sttady-state brightness level is shown. Thus, in referring to FIGURE 7, the complimentary hues A and B, provided by the phosphors excited by fixed object echoes, form a substantially white C luminescent display 79 in the screen 25' as observed through the face portion 20 of the tube 11. The rate of scan of the radially-moving trace 81 and the persistences of the additive phosphors are such that at least a portion of the visible luminescence of the fixed object display is maintained between successive scans.

With reference to FIGURE 4, the color screen excitation resultant of the echo signal from a moving object is diagrammatically shown. The electron scanning beam 23 impinges the outer screen layer 47 as previously described, but, as the target object is moving, beam densification moves on the screen in accordance therewith. Therefore, on each succeeding scan the densified beam area is moved from its previous point of impingement, and thus there is little if any superimposed intensification of the beam. The first electron excitable phosphor 49, being the P16 short persistence material, is impinged by the densified electron beam 23 and excited to give off ultraviolet emission, but with each successive scan the densified portion of the beam shifts to sequentially excite different groups of P16 particles. Since the inner screen layer, comprised of P2 phosphor, requires a long period of build-up there is an insufficient amount of ultraviolet radiation emitted by the P16 particles during a single scan to appreciably excite the P2 phosphor to any degree of luminescence. However, excitation of the substantially red-emitting second electron responsive phosphor 51 in the outer screen layer 47 produces a luminescent emission indicated as B in diagrammatic color block 59. The small amount of P2 luminescence is indicated by narrow block A. Since B is predominant, and in this instance is substantially red, the display color evident from a moving object is outstandingly B plus a small amount of additive A to produce a resultant reddish hue B'.

Figure 6:
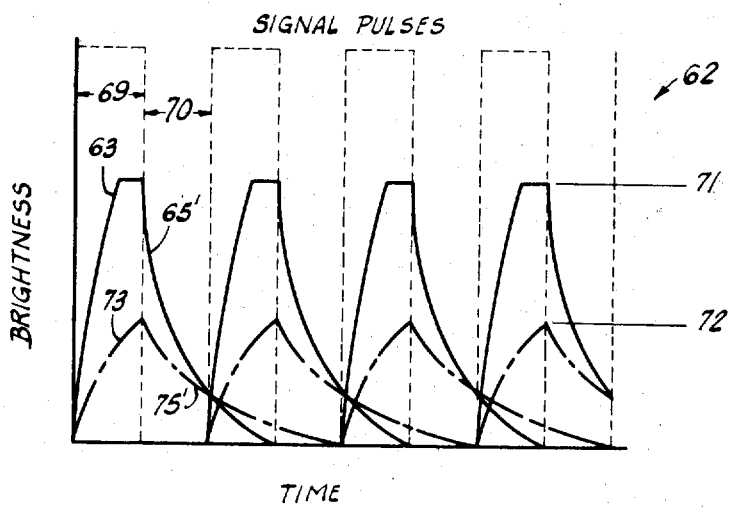
FIGURE 6 is a growth-decay curve showing the relationship between the excited luminescent phosphors as portrayed in FIGURE 4.

For a more detailed explanation of the moving object display, reference is made to FIGURE 6, wherein another growth-decay comparison 62 is presented. As with FIGURE 5, the build-up in brightness of the second electron excitable phosphor 51 represented by growth curve 63, reaches a steady-state level 71 within each pulse width 69. Since the object is moving, different luminescent centers of the phosphor are excited during each successive pulse. For each build-up of excitation, the persistence curve 65' indicates a normal continuance of decay. As previously explained, signal pulse width 69 is insufficient to permit significant brightness growth of the ultraviolet excitable phosphor 41 as indicated by growth curve 63. As the echo signal from the moving object also excites different luminescent centers in this phosphor, there is no cumulative build-up and the brightness level 72 never exceeds that of the initial pulse excitation. The result is a very low level of brightness for green hue A. Each successive excitation is accompanied by a normal decay as evidenced by persistence curve 75'. Thus, for moving objects, the predominance of the B brightness level 71 provides a screen display in the form of a moving reddish hued luminance B', shown as a pip 85 in FIGURE 7. This pip diminishes in accordance with the persistence of the phosphor and rate of scan of the trace 81. There may be occasions when very slow moving objects are observed at a rapid rate of scan, whereupon the information pip may evidence a red leading portion, a pinkish body portion, and a dim green trailing portion.

To achieve the desired color differentiation or shift in the display, the proper relationship between scan rate and persistence is important. For example, in a multi-layered screen utilizing P2 phosphor in the inner screen layer in conjunction with P16 and P22 Rare Earth Red phosphors in the outer layer, excellent color shift is noted at ten to twenty scans per second; acceptable color shift is apparent down to five scans per second; and little color shift is noted at lower rates of scanning. For scan rates above five cycles per second, the natural persistence of the eye makes the interpreted color a function of the color at the time of excitation. However, for scans slower than five cycles per second, the eye is viewing the color of the decay. To obtain a satisfactory color shift, a phosphor system employing at least two visibly excited phosphors of differing persistences and emissions is needed.

The persistences must be such that the varying levels of brightness of both phosphors are still visible at the time of the next scan. In indicating moving objects, the luminescence of the faster of the two phosphors predominates, whereas both luminescent colors are approximately equal and additive for depicting stationary objects.

Comparative luminescent displays are thus provided by a screen comprising a phosphor system wherein information relating to fixed and moving objects is evidenced by easily discernible hues resultant from the utilization of at least two cooperating phosphors having different persistences and luminescent emissions. As a result, the accurate judgment of color differentiation is facilitated and associated fatigue inducement is reduced to a minimum. Display devices having screens utilizing the phosphor systems herein described readily lend themselves to expeditious and inexpensive fabrication procedures. While substantially white and red luminescent displays have been described, other differential color or luminescent combinations may be utilized in keeping with the concept of the invention.

While there have been shown and described what are at present considered the preferred embodiments of the invention, it will be obvious to those skilled in the art that various changes and modifications may be made therein without departing from the scope of the invention as defined by the appended claim.

We claim:

1. In a cathode ray tube having an electron beam source positioned therein, a luminescent display screen formed on a substantially transparent supporting medium relative to said electron source, said screen comprising:

an inner screen layer disposed on said supporting medium having a light transmission characteristic in excess of 60 percent, said inner layer being formed of a radiant energy excitable phosphor having a long persistence;

a selective barrier filter layer of uniform thickness and continuous coverage disposed over said inner screen layer, said filter layer being selected from the group consisting essentially of converted silicon dioxide and a ceramic glaze of melted leadless glass, said filter layer being substantially transparent to radiant energy emission and impervious to electron penetration; and an outer screen layer disposed in a continuous manner on said filter layer and formed of a mixture of first and second electron responsive phosphors of substantially similar particle sizes, said phosphors in said outer screen layer being combined according to weight proportions of substantially 60 to 85 percent of said first phosphor, and substantially 15 to 40 percent of said second phosphor, said first phosphor having a short persistence and a radiant energy emission in substantially the ultra violet region of the electromagnetic spectrum and said second phosphor having a medium persistence and a radiant energy emission in the visible wavelength portion of said spectrum; said phosphors in said inner and outer screen layers forming a system responsive to an electron beam scan rate of less than twelve scans per second to provide a differential color display representative of fixed and moving indicia; said radiant energy excitable phosphor being a substantially green-emitting material in the form of copper activated zinc-sulphide, said first electron responsive phosphor being a substantially ultra-violet light emitting material in the form of cerium activated calcium magnesium silicate, and said second electron responsive phosphor being a substantially red-emitting material in the form of at least one rare earth host compound selected from the group consisting essentially of the several vanadate-containing host compounds of yttrium, gadolinium and lutecium, and the several oxide-containing host compounds of yttrium, gadolinium, and lutecium, said individual host being activated with at least one rare earth element selected from the group consisting essentially of europium and samarium.

References Cited

UNITED STATES PATENTS

| | | | |
|---|---|---|---|
| 2,423,830 | 7/1947 | Fonda. | |
| 2,435,436 | 2/1948 | Fonda. | |
| 2,446,248 | 8/1948 | Shrader. | |
| 2,452,522 | 10/1948 | Leverenz. | |
| 3,280,358 | 10/1966 | Thompson. | 313—92 |

FOREIGN PATENTS

| | | |
|---|---|---|
| 1,022,930 | 3/1966 | Great Britain. |

ROBERT SEGAL, *Primary Examiner.*